(12) United States Patent
Castellanos et al.

(10) Patent No.: US 8,719,769 B2
(45) Date of Patent: May 6, 2014

(54) QUALITY-DRIVEN ETL DESIGN OPTIMIZATION

(75) Inventors: Maria G. Castellanos, Sunnyvale, CA (US); Umeshwar Dayal, Saratoga, CA (US); Alkiviadis Simitsis, Santa Clara, CA (US); William K. Wilkinson, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1294 days.

(21) Appl. No.: 12/543,357

(22) Filed: Aug. 18, 2009

(65) Prior Publication Data

US 2011/0047525 A1   Feb. 24, 2011

(51) Int. Cl.
*G06F 9/44* (2006.01)
*G06F 17/00* (2006.01)

(52) U.S. Cl.
USPC .......................................... 717/104; 707/602

(58) Field of Classification Search
CPC .............................. G06F 17/30424; G06F 8/40
USPC .......................................... 717/104; 707/602
See application file for complete search history.

(56) References Cited

U.S. PATENT DOCUMENTS

| | | |
|---|---|---|
| 6,208,990 B1 | 3/2001 | Suresh et al. |
| 6,490,590 B1 | 12/2002 | Fink |
| 6,694,310 B1 | 2/2004 | Yu et al. |
| 7,343,585 B1 | 3/2008 | Lau et al. |
| 7,904,894 B2 * | 3/2011 | Entin et al. ................ 717/151 |
| 8,103,656 B2 * | 1/2012 | Krishnamoorthy et al. .. 707/713 |
| 2005/0091208 A1 * | 4/2005 | Larson et al. .................... 707/3 |
| 2008/0092112 A1 * | 4/2008 | Jin et al. ........................ 717/106 |
| 2009/0198646 A1 * | 8/2009 | Krishnamurthy et al. ........ 707/3 |

OTHER PUBLICATIONS

Simitsis, et al., OPtimizing ETL Processes in Data Warehouses, Proceedings of the 21st International Conference on Data Engineering (ICDE 2005) 1084-4627/05 $20.00 © 2005 IEEE.*

* cited by examiner

*Primary Examiner* — Philip Wang

(57) ABSTRACT

A method for quality objective-based ETL pipeline optimization is provided. An improvement objective is obtained from user input into a computing system. The improvement objective represents a priority optimization desired by a user for improved ETL flows for an application designed to run in memory of the computing system. An ETL flow is created in the memory of the computing system. The ETL flow is restructured for flow optimization with a processor of the computing system. The flow restructuring is based on the improvement objective. Flow restructuring can include application of flow rewriting optimization or application of an algebraic rewriting optimization. The optimized ETL flow is stored as executable code on a computer readable storage medium.

22 Claims, 9 Drawing Sheets

QUALITY-DRIVEN ETL DESIGN OPTIMIZATION

BACKGROUND

Business intelligence (BI) is used to help a business acquire a better understanding of a commercial context of the business. Business intelligence may also simply refer to information collected by or for the use of the business. BI technologies can provide historical, current, predictive and other views of business operations. Common functions of business intelligence technologies are reporting, online analytical processing (OLAP), analytics, data mining, business performance management, benchmarks, text mining, and predictive analytics. One goal of BI is to support better business decision-making.

Tools and software for business intelligence have been developed which can enable, among other things, dynamic querying of real-time corporate data by employees, and a more web- and browser-based approached to such data. Some BI management tools utilize extract, transform, and load (ETL) processes. ETL processes may be utilized in the management or creation of databases or data warehouses. ETL generally involves extracting data from outside sources, transforming the data to fit operational needs (which can include quality definitions), and loading the data into an end target (e.g. a database or data warehouse). ETL can be a beneficial tool in the creation and management of efficient and consistent databases and data warehouses.

As business intelligence increasingly comes under focus for organizations and evolves from strategic intelligence to operational intelligence, the complexity of ETL processes grows. As a consequence, ETL engagements can become very time consuming, labor intensive, and costly. Quality objectives in addition to the traditionally considered functionality and performance objectives increasingly need to be considered in the design of ETL processes. However, ETL flow design quality can suffer from lack of proper ETL flow optimization due to the complexities involved in ETL design. The BI industry lacks methodologies, modeling languages and tools to support ETL flow design in a systematic, formal way for achieving the desired quality objectives. Current practices handle ETL flow design with ad-hoc approaches based on a designers' experience. This can result in either poor designs that do not meet the quality objectives or costly engagements that require several iterations to meet them.

DETAILED DESCRIPTION OF EXAMPLE EMBODIMENT(S)

Figure 1:
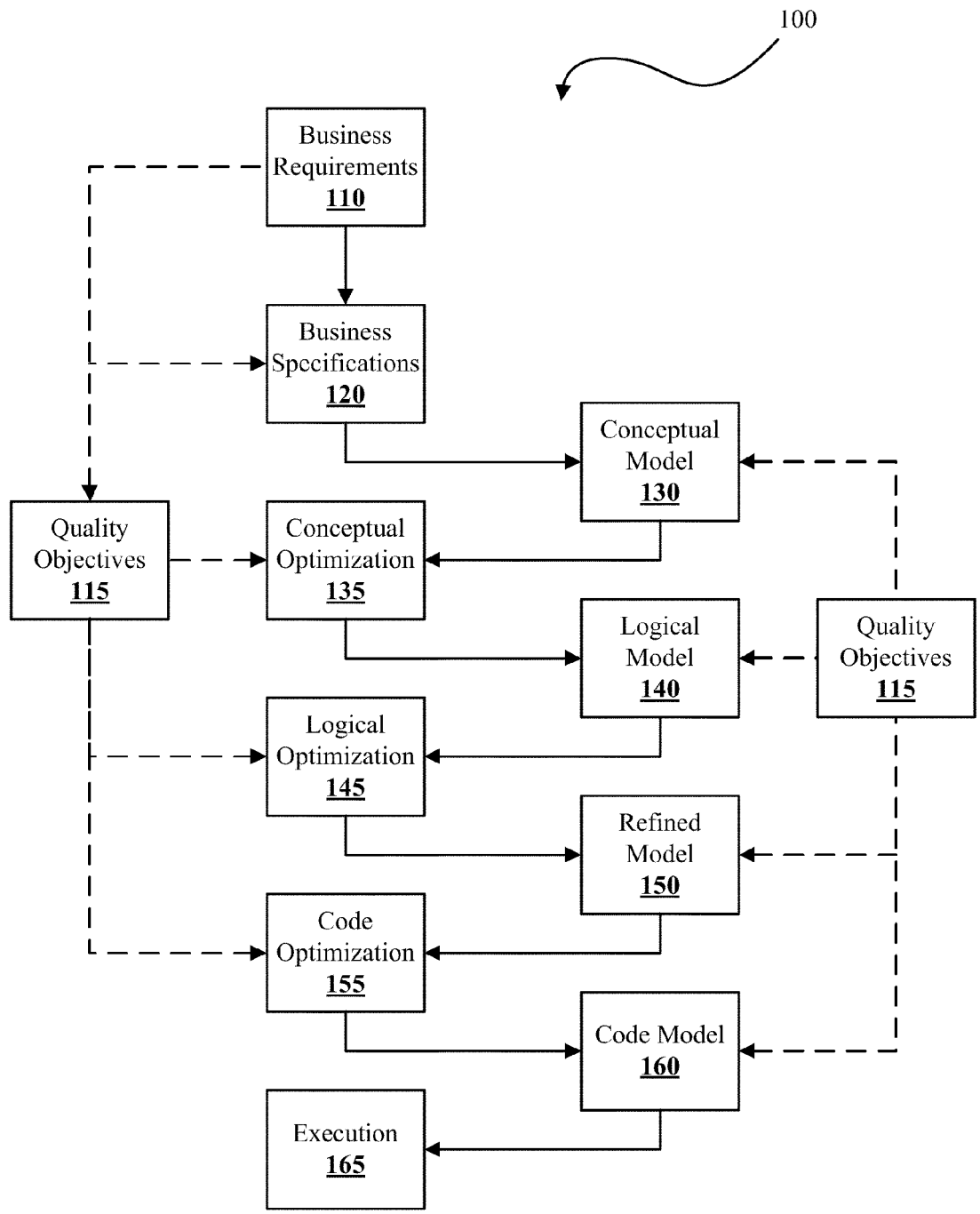
FIG. 1 is a flow chart of a method for designing an optimized ETL flow using a business model, a conceptual model, a logical model, a refined logical model, and a code model in accordance with an embodiment.

Reference will now be made to the exemplary embodiments illustrated, and specific language will be used herein to describe the same. It will nevertheless be understood that no limitation of the scope of the invention is thereby intended. Additional features and advantages of the invention will be apparent from the detailed description which follows, taken in conjunction with the accompanying drawings, which together illustrate, by way of example, features of the invention.

Current data warehouse architectures often utilize Extract-Transform-Load (ETL) processes. ETL processes can be responsible for: extracting data from distributed and often heterogeneous sources, cleaning and transforming that data according to business needs, and finally, loading the data to a data warehouse. ETL flow design and implementation can constitutes a majority of effort involved in data warehousing projects, and is often costly, time-consuming, and labor-intensive. ETL can provide an important path from business events (at the data sources) to business analysis and action (at the warehouse) and delays in ETL flows and ETL flow designs can directly affect business operational effectiveness. Thus, there is a need for making ETL flows and flow designs less expensive and faster.

A lifecycle of an ETL flow design often begins with gathering business and technology requirements. The business requirements specify information needs and service level objectives like overall cost, latency between operational event and warehouse load, provenance needs, and so on. The technology requirements specify the details of data sources and targets, transformations, infrastructure, dependencies and constraints on extracts and loads, and system availability. These requirements can be synthesized into specifications that are combined to form a high-level conceptual design. These specifications are followed by the construction of models to capture data flows from operational systems to a data warehouse. Finally, the models can be constructed in an implementation language such as SQL, a scripting language or some ETL engine (e.g., Ab Initio®, DataStage®, Informatica®, etc.).

A prevalent focus for ETL is on correct functionality and adequate performance, i.e., the functional mappings from data sources to a data warehouse are correct and ETL runs are completed within a certain time window. Correctness and performance are valuable objectives. However, additional objectives are important as well. ETL designers often deal with a host of quality objectives besides performance, including: reliability, recoverability, maintainability, freshness, scalability, availability, flexibility, robustness, affordability, and auditability. However, neither the modeling languages discussed nor ETL tools capture such quality objectives or provide a formal mechanism to quantify, track and measure such quality objectives. As a result, performance objectives may be dealt with informally based on the best practices and experience of the ETL designer. In translations from high-level business and technical requirements to detailed ETL specifications, objectives may be dropped making a final implementation sub-optimal with respect to the project objectives. Correcting for this can add time, cost, and complexity to the engagement. Thus, not only is there a need for a reduction in time and costs of ETL flow designs, but there is a need for facilitating the generation of optimal ETL flow designs that incorporate all of a project's objectives.

A technology for quality objective-based ETL pipeline optimization can be provided. An improvement objective may be obtained from user input into a computing system. The improvement objective may represent a priority optimization desired by a user for improved ETL flows for a target application designed to run in memory of the computing system. Computing components available for processing ETL flows are determined and an ETL flow can be created in the memory of the computing system. In some embodiments, an ETL flow may comprise a data source, a set of logical transformations for data (such as: sum, join, filter, surrogate key generation, etc.), and a destination for the data. The ETL flow is restructured for flow optimization with a processor of the computing system. The flow restructuring is based on the improvement objective and the available computing components. Flow restructuring can include algebraic rewriting and flow rewriting techniques. As used herein, the terms "flow rewriting techniques" refer to non-algebraic flow rewriting except where indicated as algebraic rewriting. The optimized ETL flow is stored as executable code on a computer readable storage medium. In some embodiments the ETL flow optimization technology can be automated.

FIG. 1 depicts a layered methodology that proceeds in successive, stepwise refinements from high-level business requirements, through levels of more detailed specifications, and down to execution models. The first step of the method 100 of FIG. 1 is the gathering of requirements and objectives 110. This can be done through interviews, examination of documents, analysis of systems and data, etc. The requirements gathering step can synthesize information from many disparate sources.

The outcome of this step is the identification of business information objects, business specifications 120, and objectives for the project including the identification of desired quality objectives or metrics 115. In one aspect, business specifications may include information such as orders, products, customers, stores, suppliers, etc., and the associated relationships among these objects. Business specifications may include customer arrivals rates, order rates, product hierarchies, etc. The business specifications may also include intended use cases for a data warehouse, such as types of reports, types of ad-hoc queries, etc. The business specifications may also include business processes that operate on the information objects. The business specifications can be ultimately used to derive an implementation of an ETL process optimization, and as a result inclusion of provenance information in resulting business specifications 120 can be useful in tracking a project detail back to an ultimate source. The provenance information may include quality or accuracy measures for identification of a most authoritative source in cases of conflicting information. Provenance may refer to the source or lineage of information/data or information/data changes.

A non-exhaustive list of quality objectives 115 or metrics identified with the identification of business specifications 120 can include performance, reliability, recoverability, maintainability, freshness, scalability, availability, flexibility, robustness, affordability, auditability, consistency, and traceability. What is meant by each of these metrics will be described in further detail herein. In one aspect, identification of quality objectives or metrics can include an attempt to quantify such objectives or metrics. For example, maintainability might be specified as an important design goal with impact on the management phase of the project, but may be difficult to quantify. However, a desired freshness of data, or certain availability and performance metrics might be known at this point in the process 100.

Expression of the business information objects and processes in terms of a business model can help establish a correspondence between business goals and objectives at a business or management process level and operational logistics at logical and physical levels. For example, a business model may be created by leveraging terminology used by the business processes which can enable the use of design tools built around the terminology and the business goals and objectives.

Given the business specifications, the next step of FIG. 1 is the creation of a conceptual model 130. The conceptual model can describe data flows at a high level, as well as data sources, data targets or destinations, and mappings between the sources and targets. The conceptual model can also describe dependencies and constraints among flows. A conceptual model can enable expression of dependencies among flows and certain types of optimizations. Certain flow-based or conceptual optimizations 135 can be done based on the conceptual model. For example, flows with no dependencies in their sources and targets may be run in parallel, or flows with common sources might be considered for joint extraction. The conceptual optimizations can be performed based on the quality objectives or metrics so as to further that objective or achieve a result closer to that objective through flow-based optimization.

Given a conceptual model 130 and performance of conceptual optimizations 135, the next step in FIG. 1 is the generation of a logical model 140 based on expanding the conceptual model to include specific transformations for flow mappings. A logical model can be expressed as a graph of algebraic operators with tuple (data) flow between operators. Logical optimizations 145, such as algebraic optimizations, can be performed using the logical model. Such logical optimizations can be independent of an eventual physical implementation. The generation of the logical model can take into account the quality objectives or metrics, and tradeoffs among various quality objectives or metrics. For example, fast recoverability from a failure might include the use of additional recovery points to establish landing tables that can be used to restart a flow. Cost-based techniques can be used to produce a more detailed or refined logical model 150 based on the logical model 140, the refined logical model being matched to a physical implementation for the process.

Through processes such as code optimization 155, compilation, scheduling, resource allocation, and consideration of the quality objectives or metrics, a physical or code model 160 can be generated based on the refined logical model 150 and can be executed 165. The code model can include computer executable code and may be on a computer readable storage medium. The code model can be dependent on a specific implementation technology chosen for implementing the data integration flows. Examples of implementation technology include custom scripts, ETL engines, etc. As an example, a code model for Informatica® may differ from one for DataStage® given the different capabilities of these ETL engines. As with the other levels of the process 100, generation of the code model 160 and the code optimizations 155 of the model can be driven by the quality objectives or metrics. The process may be iterative so that from each level the process may go back to one or more previous levels to improve or to complete that level or to achieve other purposes.

In one embodiment, the above described process 100 can provide automatic generation of ETL flows from conceptual and/or logical models. Computer readable code can be provided for automatically or semi-automatically implementing a systematic approach for ETL flow design based on quality objectives tradeoffs and successive refinement from business levels through to physical implementation levels. Advantageously, automatic or semi-automatic ETL flow generation from conceptual or logical models can operate on a specific subset of ETL transformations (such as ETL transformations corresponding to schema matching and mapping) or to an entire set of ETL transformations for a flow.

Figure 2:
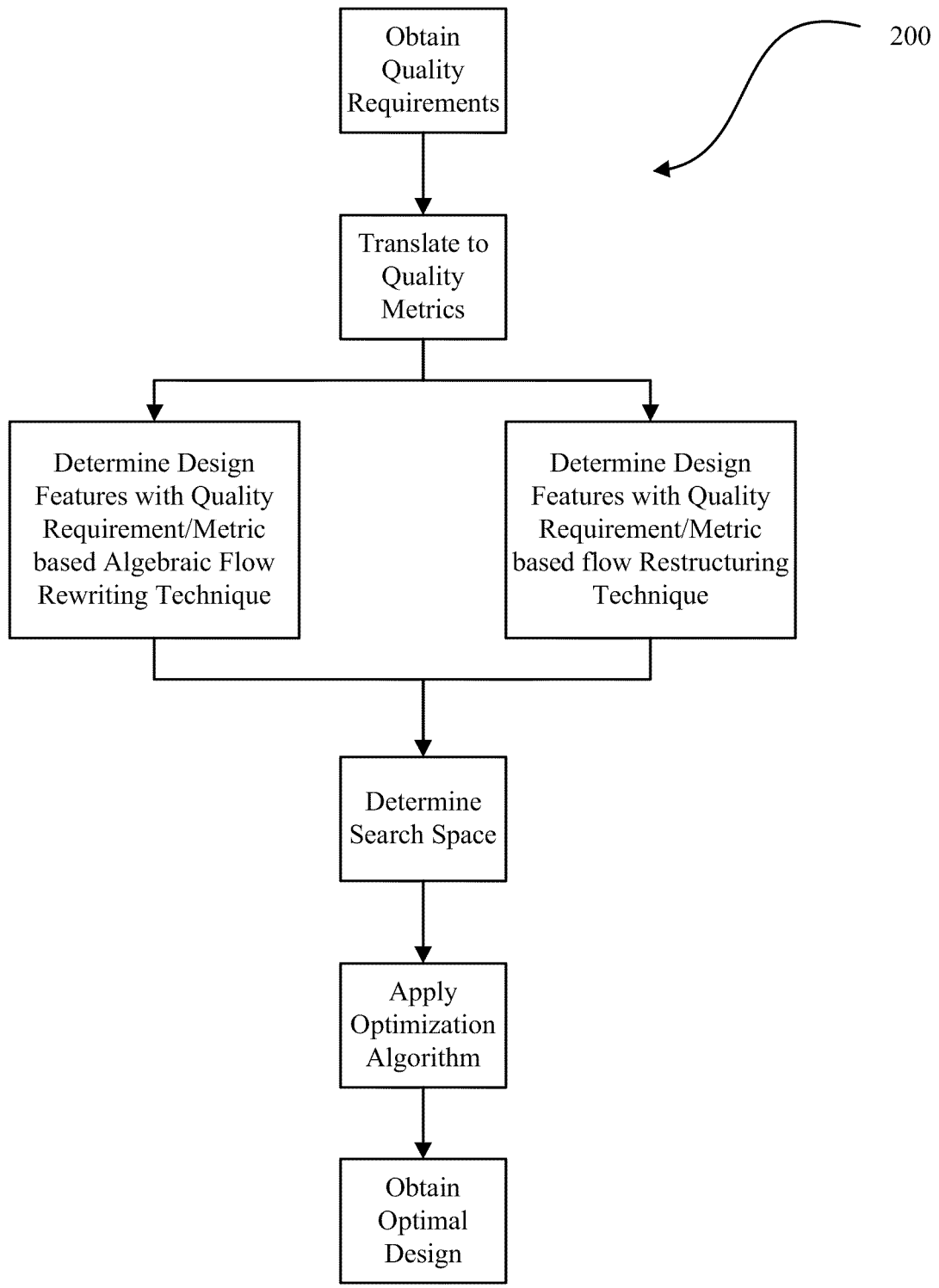
FIG. 2 is a flow chart of a method for optimizing an ETL flow using one of an algebraic flow rewriting technique and a flow restructuring technique in accordance with an embodiment.

At each level of the above described ETL design process, quality objectives or metrics are introduced or refined from previous levels. Such a layered approach can provide for optimization at each successive level of specification. Of course, optimizations at just one or more of the levels can still provide benefits and assist in flow optimization and not all optimizations will necessarily be used in every flow design. Referring to FIG. 2, for example, algebraic rewriting may be performed without also performing flow rewriting and vice versa while still providing improvements in the ETL flow and ETL flow design process 200.

Optimizations at all design levels can be driven by quality objectives or metrics. Use of these metrics can reduce a search space of possible designs, much like cost-estimates are used to bound the search space in cost-based query optimization. In other words, certain ETL flow transformations or optimizations can advance certain quality objectives more than other quality objectives, so a determination of objectives or metrics can drive optimization by effectively limiting which optimizations are available for implementation. At each design level, operators constituting ETL flows can be extended with specifications influenced by quality metrics. Such a configuration can help facilitate automatic or semi-automatic transition within and between the design levels. In other words, there may be any number of alternative translations from a conceptual model to a logical model and these alternatives can be driven by the quality objectives and tradeoffs. Similarly, a translation from the logical model to a physical model can enable additional types of optimizations. For example, a join operator at the conceptual level can be annotated with information stating a high requirement for freshness. This information can indicate at the physical level a choice of a physical implementation for join, such as may be suitable for a real-time environment.

A non-exhaustive list of metrics that can be used to guide optimization include: performance, recoverability, reliability, freshness, maintainability, scalability, availability, flexibility, robustness, affordability, consistency, traceability, and auditability. Definition and measurement of these metrics can be useful in implementing the ETL optimizations described herein. Some metrics are quantitative (e.g., reliability, freshness, cost) while other metrics may be difficult to quantify (e.g., maintainability, flexibility). Proposed definitions and quantifications of at least some of the above-mentioned metrics are included below.

Performance. Performance can refer to elapsed time in executing an ETL workflow. For a given workflow, there may be several techniques to reduce the execution time that an optimizer might consider. As an example, resources allocated for the ETL execution (e.g., giving more memory or processing power) may be increased. This process may involve fine-grained tuning (e.g., some operations may need a greater extent of the available memory than some others) and appropriate scheduling at both the data and the process level. One example of performance-based optimization is to place the most restrictive operations at a start of the flow. Such algebraic optimization can be done in several phases of the design: conceptual, logical, and physical. At the conceptual and logical levels, specific implementation details of the design may not be available, but a designer may recognize that a conceptual operator containing a join operation, such as surrogate key assignment, is more expensive than a filter operation that may reduce the moving data volume. Another performance technique may be to gather pipelining and blocking operations separately from each other. For example, ETL flows may be more efficient if a sequence of the form {filter, sorter, filter, filter, function, grouper} was modified to {filter, filter, filter, function, sorter, grouper}. In addition to algebraic optimization, another technique is to partition data using any of current broadly available methods (e.g., round-robin, hash-based, key-value, etc.) and to parallelize the flow (or at least parts of the flow). However, this may not be an automated task and may be better suited to be designed manually. Additionally, parallelizing a flow does not necessarily improve flow performance in all situations. Parallelization can be more useful when smaller data volumes are involved because of the high cost of merging back partitioned data. Consideration may be given to where to split and merge parallel flows, most appropriate partitioning methods to be used, a number of parallel flows and processors to be used (the two numbers are not necessary equal), etc.

Recoverability. ETL processes can be based in software and as such may face a probability of suffering from errors. Recoverability reflects the ability of an ETL flow to resume after interruption and restore the process to the point at which a failure occurred within a specified time window. An error usually occurs when a tuple does not arrive at the target data warehouse at the expected time and form. Such an error can be a result of an ETL operation failure or a system failure. An ETL operation failure is generally minimizable through a thorough testing of the design. Usually such ETL operation failure errors arise due to an evolution of the ETL design or the modification of the underlying systems (e.g., a software or hardware update). System failures are generally more difficult to minimize or restrain. System failures may be due to network, power, human, resource or other (miscellaneous) failures.

To deal with errors and increase recoverability there are various options. For example, the ETL process may be restarted. However, in most cases this option may not be necessary as the uninterrupted ETL execution usually nearly fits in the available time window. Another option can be to insert recovery points at several places in the ETL workflow to make a persistent copy of the flow. Candidate places for recovery points generally include: just after extraction or before loading (as landing tables or files), within the transformations flow (as intermediate tables or files), or at any temporary storage points used by blocking operators (e.g., sorters, etc.). With such an option enabled, in the presence of a failure the system can restart from a closest recovery point that contains correct data. It will be recognized that the introduction of a recovery point may add an additional I/O (Input/Output) cost for writing to a computer readable storage medium or to memory, but this can be amortized over an operational cost of the covered operations (the operations that precede the recovery point). A designer can also take into consideration the failure probability at different places of the workflow. Various quantitative measures can be used to express recoverability requirements such as means time to recover.

Reliability. Reliability may be described as the probability that an ETL process will perform its intended operation during a specified time period under given conditions. In the presence of a failure it is generally desirable that an ETL process either resume from where the process stopped or be immune to the error that occurred. The use of recovery points is useful for resuming where the process stopped. However, if an available execution time window does not allow having recovery points (such as due to the I/O cost needed for recovery point maintenance) or if the business requirements include a demand for high reliability, an alternative to cope with system failures is to increase the software reliability (or in other words, to improve the ETL workflow performance over time).

ETL reliability can represent a probability that an ETL design will perform an intended operation during a specified time period under given conditions. In general, fault-tolerance can be achieved by either replication (running multiple identical instances of a flow in parallel), redundancy (providing multiple identical instances of a flow and switching to one of the remaining instances in case of a failure), or diversity (providing multiple different implementations of a flow, and using them as replicated systems to cope with errors in a specific implementation). Various qualitative measures may be related to reliability, such as computation availability (i.e., the expected computation capacity of the system at given time t) or computation reliability (i.e., the failure-free probability that the system will execute a task of length x initiated at time t without an error). Such measures may usually be quantified during the above-described gathering of business requirements and be expressed in terms of more fine-grained quantitative measures such as: the mean time to failure, mean computation before failure, capacity threshold, computation threshold, etc.

Freshness. Freshness concerns latency between an occurrence of an event at an operational system (or data source) and its appearance in a data warehouse or database. Better freshness (i.e., reduced latency) may involve performance improvements, alternative design, or both. Performance improvements can affect resource allocation (e.g., more memory and processing power should be assigned to that flow) or techniques related to performance improvement (e.g., re-arranging operators). Alternative design may involve design decisions such as whether to use parallelism, or using replication or redundancy instead of recovery points. Also, depending on the incoming rate of tuples, alternative design implementation techniques more suitable for faster incoming rates may be considered at the physical level. Such alternative design implementation techniques can include use of lightweight ETL flows, avoidance of blocking operations, and more careful scheduling of both the data flow and execution order of transformations.

Maintainability. Maintainability can be described as the ability of an ETL process to be operated at a design cost and in accordance with service level agreements. Maintainability can be more difficult to quantify than other metrics and as a result is often overlooked in ETL workflow design. At some point in time, having overlooked maintainability generally increases development cost, overall project cost (e.g., in terms of people engaged in it), and performance cost (e.g., as a result of haphazard coding). Examples of maintainability are as follows. First, if a design is readable and well documented the task of a designer in making modifications to the design is made easier, particularly when the designer is not the designer of the original design. Second, when a change occurs at a source or target schema (e.g., insert of a new attribute, modification of a data type, drop/rename of a table/view, etc.), the workflow should easily adapt to the change. Accordingly, maintainability can be an important measure in driving ETL design. Metrics for maintainability of a flow can include size, length, modularity (cohesion), coupling, and complexity, among others.

Cost. Cost can be expressed in financial units, time units, personnel requirements, hardware requirements, etc. The quality metrics described herein span different design levels. As regards cost and design levels involving software artifacts, the cost quality metric can be expressed in terms of resources needed for the ETL execution, such as memory, disk space, processing power, network availability, speed, and other hardware and software resources. For example, the cost of buying an ETL tool can be balanced with the actual needs of the project and the prospect for future scaling. In addition, total costs of owning, developing, using, and maintaining ETL software as well as training and employing personnel for operating ETL software can be considered.

Scalability. Scalability may be described as the ability of an ETL process to handle differing volumes of data (usually higher volumes of data).

Availability. Availability can refer to the probability that an ETL process is operational during a specific time period, or rather that the allocated physical resources of the system (e.g., processors, memory, external storage) will be available when needed. From an end user perspective, availability can refer to the ability of the ETL process to provide the required data in the data warehouse within specified time and accuracy constraints.

Flexibility. Flexibility can be described as the ability of the ETL process to accommodate previously unknown, new or changing requirements.

Robustness. Robustness may be the ability of an ETL process to continue operating well or with minimal harm, despite abnormalities (including unpredictable abnormalities) in input, calculations, functionality, etc., which may stress design assumptions.

Affordability. Affordability can refer to the ability to maintain or scale the cost of an ETL process appropriately.

Consistency. Consistency can be the extent to which the data populating the data warehouse is correct (i.e., satisfies integrity constraints) and complete.

Traceability. Traceability can be described as the ability of an ETL process to track lineage (provenance) of data and data changes Auditability. Auditability can be the ability of an ETL process to protect data privacy and security, and to provide data and business rule transparency (such as for legal compliance purposes).

Figure 3A:
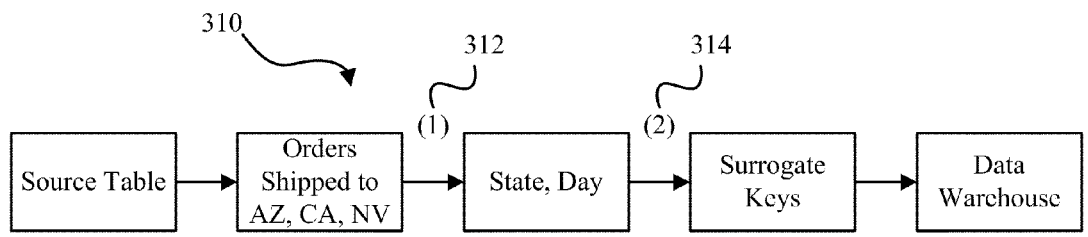
FIGS. 3A-3C are flow diagrams illustrating tradeoffs between quality objectives in accordance with an embodiment.

Identification of interrelationships and dependencies among metrics can provide information about tradeoffs for alternative optimizations of data integration flows. For example, a design may sacrifice performance for maintainability. While partitioning and parallelization may increase freshness, maintainability and robustness may be degraded as a result. Reference will be now be made to an ETL flow design in FIGS. 3A-3C in which tradeoffs among metrics such as performance, freshness, reliability, auditability, recoverability, or cost are considered. In FIG. 3A, client orders are used to populate a data warehouse table, the data for the client orders coming from a source table in a single sequential flow 310. For this example, only orders that have been placed and shipped in three states Arizona, California, and Nevada are considered and are grouped and aggregated by state and by day. Before loading the data into the data warehouse, production keys may be replaced with surrogate keys.

Figure 3B:
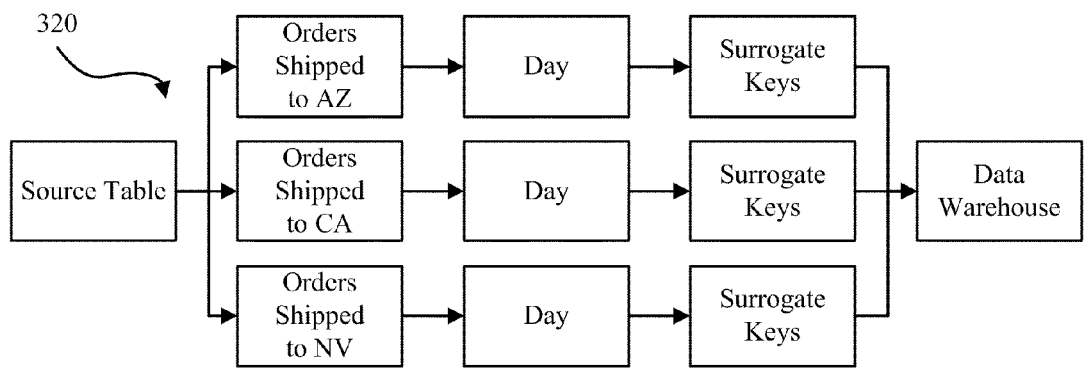

Referring to FIG. 3B, an objective is to improve performance and ensure recoverability and maintainability of the flow of FIG. 3A. In FIG. 3B, three machines are available to execute the ETL flow 320. Thus, parallelism may be introduced for improving performance. As an example, three different ETL flows may be created, each ETL flow being responsible for processing one state's data. For recoverability the flow may include a number of recovery points, such as backup tables, landing tables, files, etc. If a failure occurs, the process can continue from the latest recovery point instead of starting again at the beginning. For the ETL flow of FIG. 3A, flow points (1) 312 and (2) 314 may be candidate places for recovery points. However, for the parallel ETL flows of FIG. 3B there may be six candidate recovery points, two for each flow. Where three machines are used in FIG. 3B each machine may experience a similar cost for recovery points as the individual machine of FIG. 3A, but performance is enhanced by the use of multiple machines. However, the use of recovery points may degrade freshness. One solution for avoiding freshness degradation may be to ensure robustness (and in doing so, reduce the need for recovery points) by means of redundancy.

Figure 3C:
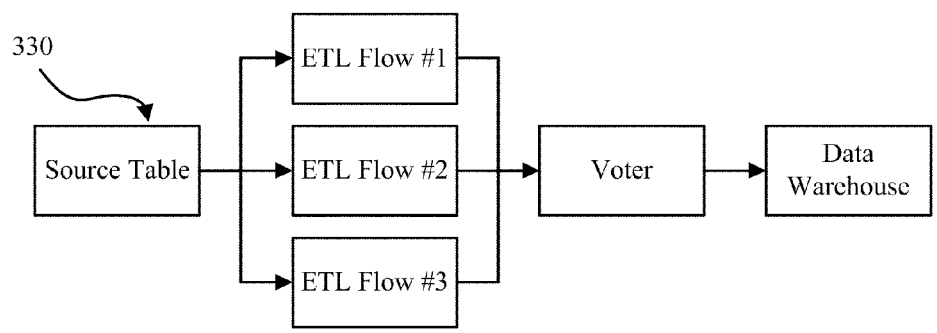

As an alternate optimization of the flow of FIG. 3A, instead of using the three machines for parallel processing of subsets of the source data as in FIG. 3B, the machines may be used for three parallel, redundant executions of the ETL flow 330 of FIG. 3A, as shown in FIG. 3C. In FIG. 3C, even if a failure were to occur in a flow, a voter placed at the end of the three flows can decide which flow copy to trust. Thus, the flow in FIG. 3C can improve reliability of data arriving at a data warehouse.

While FIGS. 3B and 3C may depict flows having improvements over the flow in FIG. 3A in terms of recoverability and reliability, there may be scenarios in which a flow such as depicted in FIG. 3A provides a desired objective. For example, supposing maintainability is an objective, the maintainability of the flow depicted in FIG. 3A may be better than that of the flows depicted in FIG. 3B or 3C because the flows of FIGS. 3B and 3C have a larger size (more nodes), lower modularity (each conceptual task, e.g., surrogate keys assignment, is performed more than once), and greater complexity.

To assist in evaluation of trade-offs of different metrics such as described above with regards to FIGS. 3A-3C, an NFR (Non-Functional Requirement) framework may be employed for making explicit a relationship between quality requirements and design decisions. An NFR framework can be used to distinguish between two types of requirements: Functional Requirements (FR) and Non-Functional Requirements (NFR). The functional requirements can include specific functionalities of a system (e.g., what the system must do; i.e., an ETL process populates a data warehouse). The non-functional requirements may include attributes about a system and system operation, or rather, how the system accomplishes tasks (for example, the ETL process populates the data warehouse fast). NFR may be described in terms of two classes of metrics: qualitative and quantitative. Qualitative metrics may include soft-goals such as "an ETL process should be reliable". Quantitative metrics may include functional parameters of a design and of a system such as: time window, execution time, recoverability time, arrival time, number of failures, latency of data updates, memory, space, CPU utilization uptime, throughput, number of processors, etc.

Figure 4:
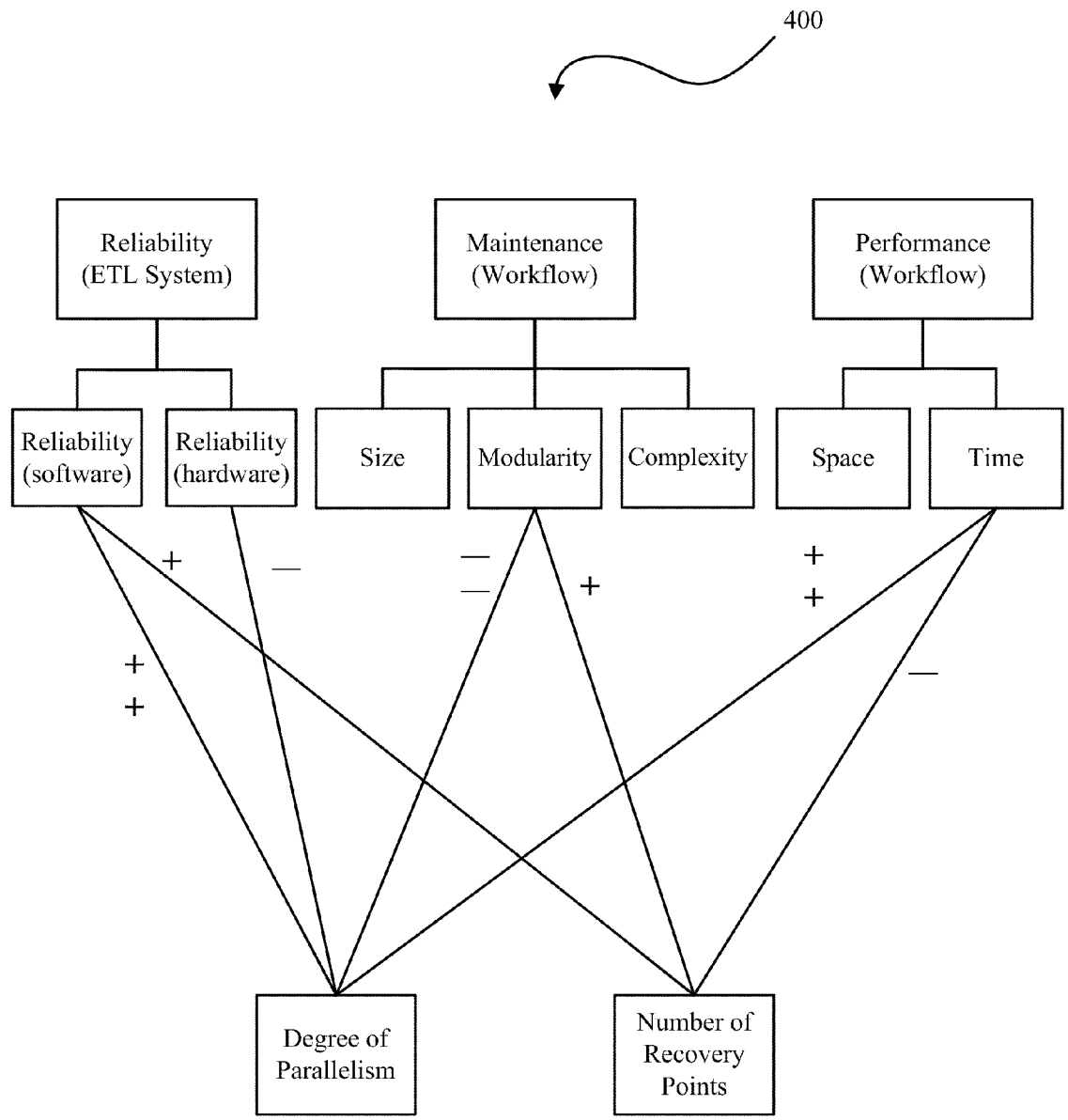
FIG. 4 is a soft-goal interdependency graph for use in flow optimization according to an embodiment.

Referring to FIG. 4, a soft-goal interdependency graph is used to support design modeling and evaluating tradeoffs of different metrics such as described above in FIGS. 3A-3C. In one example, the soft-goal interdependency graph may be used in designing the conceptual model as described above in FIG. 1. FIG. 4 depicts an inter-dependency graph 400 for an integration flow design desired to be reliable, maintainable, and efficient. The graph shows relationships among the soft-goals and quantitative measures. As shown in FIG. 4, a degree of parallelism can contribute positively (++) to fulfillment of the reliability(software) soft-goal, since parallelism is a form of redundancy. However, parallelism somewhat negatively (−) affects reliability of hardware (more devices increase the probability of failure), negatively (−−) affects modularity (each specific module of the system performs more than one task), and positively (++) affects time performance (the processes are executed faster). Similarly, the number of recovery points affects soft-goals differently. It will be appreciated that a design alternative such as partitioning may affect the design and the results of a soft-goal interdependency graph analysis may be different for differing degrees of parallelism. As an example, partitioning data into groups containing smaller but different volumes of data may be beneficial for time performance, but not improve reliability because if one of the parallel flows fails the final result may not be correct. However, with copy-partitioning in which there are redundant parallel flows, reliability of the system may be positively affected while having a negative affect on time performance.

As described above, optimization of integration flows using quality metrics can include optimizations made through techniques such as algebraic rewriting or flow rewriting. Flows may further be optimized by adaptation of the flows to real-time environments. Each of these operations will be discussed in further detail below.

In regards to algebraic rewriting, a data integration flow may be expressed as a graph of operators. Flow optimization may include the selection of an execution order of the operations or operators constituting a flow and selecting an implementation method for each of these operations (e.g., join algorithms). Examples of algebraic rewriting are well-known techniques such as pushdown optimization of ETL flows and pushing filter operations before expensive operation like lookups.

In regards to flow rewriting, data integration flows can be expressed in process modeling languages such as Business Process Execution Language (BPEL), process algebras, process logics, etc., and process optimization techniques such as parallelization, collapsing of long sequential chains, elimination of conditional branching nodes, factorizing common operations, etc., can be applied for flow optimization. As an example, for relatively small data volumes, an integration process can be divided into three pipelined sub-processes for extraction, transformation, and loading, while partitioning may be beneficial for larger data volumes. Another option for flow rewriting optimization is to use a combination of SQL and MapReduce functions for distributed computation of large-scale cleansing transformations, sort operations, etc. This approach may also be useful in integrating unstructured data as well as structured data because MapReduce functions can be defined for text analysis, search, etc.

Adaptation to real-time environments can be another source of flow optimization. Although requirements for freshness (low latency) may not impact a conceptual level of integration flows, challenges in processing streaming data can emerge at a physical level. At the extraction phase of an ETL flow, messages, queues, web services, change data capture (CDC), and extraction in micro-batches, among other techniques, can be used for real-time integration. In the transformation phase, a MeshJoin operator can be used to join a data stream with a persistent relation. The MeshJoin operator performs operations in transformations such as assignment of surrogate keys, identification of the newly inserted/deleted/updated tuples, lookup operations, etc. and can thus be used in a variety of transformations to adapt to a real-time environment. In the loading phase, many data warehouse engines are optimized for answering queries efficiently, and not necessarily for enabling efficient loading of data, but external utilities for bulk loading may be used, or alternatively warehouse engines supporting trickle loads using micro-batches may be used for real-time loading.

Incorporating structured and unstructured data into a data warehouse and optimizing the flows can enhance an enterprise's business intelligence. In incorporating unstructured data into a business architecture, merely storing the data in a data warehouse may not provide be an optimal solution. Extracting useful information from the unstructured data and turning unstructured data into structured data that can be stored, accessed, and analyzed along with other structured data can make the unstructured data more useful. As an example, some extraction techniques for extracting useful information from unstructured data can learn models for the retrieval of relevant entities, relationships, facts, events, etc. from text data. Some extraction techniques can include or be based on rule learning and hidden Markov models. Also, techniques have been developed for extracting information from multimedia data such as text in video frames.

Figure 5:
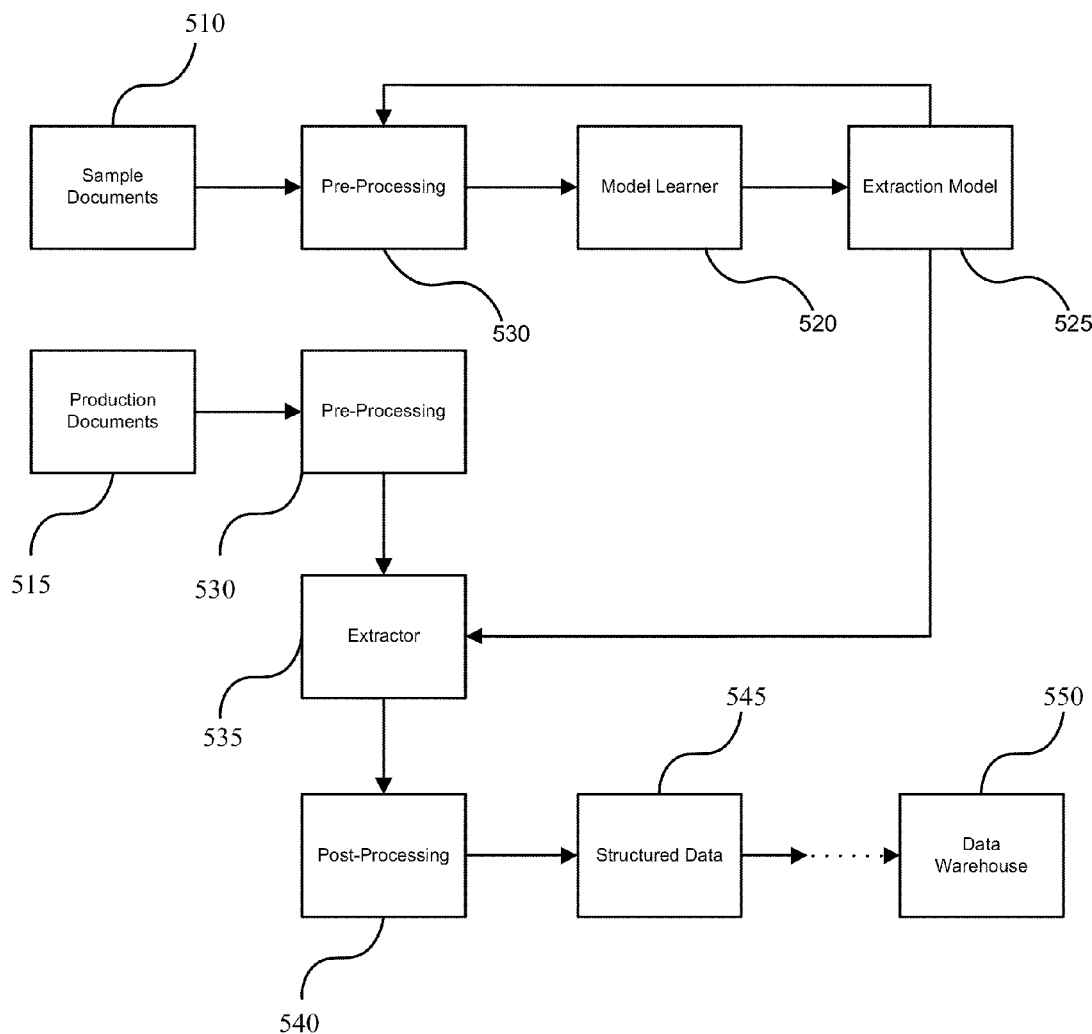
FIG. 5 is an information extraction pipeline for unstructured data in accordance with an embodiment.

FIG. 5 shows a pipeline for information extraction from text data sources wherein a goal is to extract relevant data from a collection of documents. Sample documents 510 can be preprocessed 530 and used by a model learner 520 to create an extraction model 525 for unstructured data. In one aspect, unstructured data may be any data not structured in an efficient or usable way for ETL processing. In one example, the model learner can analyze unstructured data for desired information types and locations. The model learner can then use this information to create an extraction model to extract similar desired information from other similar unstructured data. The source data or production documents 515 can also be pre-processed 530 to remove noise or to transform the data to a format usable by the ETL engine (at 535) and/or data warehouse 550. The output can be post-processed 540 to gather structured data 545 in the form of attribute-value pairs, which can then be transformed and loaded into the data warehouse 550. Because extracted data from unstructured sources often relates to data in structured sources, unstructured data can be staged into a landing area and then loaded into the data warehouse where information from both structured and unstructured sources can be consolidated (e.g., contract data is related to customer data) for use by BI applications.

Figure 6A:
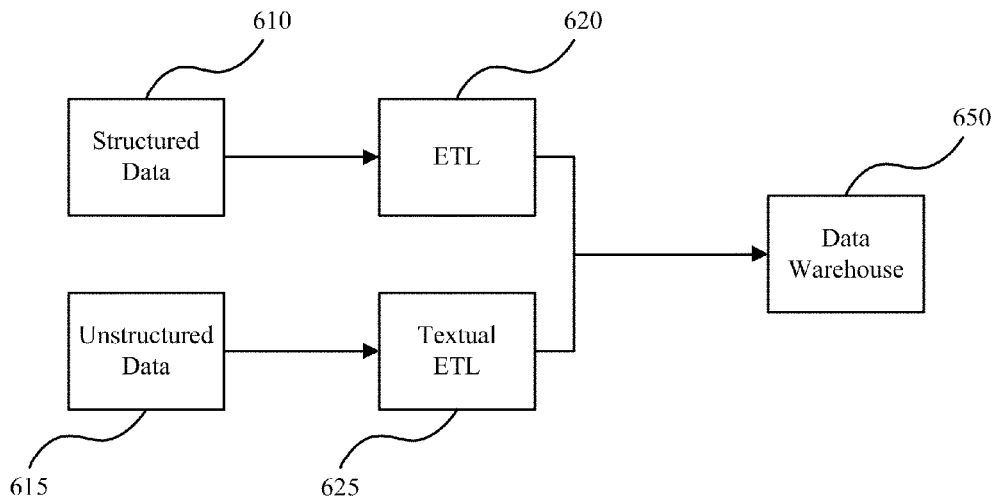
FIGS. 6A-6B are flow diagrams of separate and integrated pipelines for flows from structured and unstructured data sources in accordance with an embodiment.
Figure 6B:
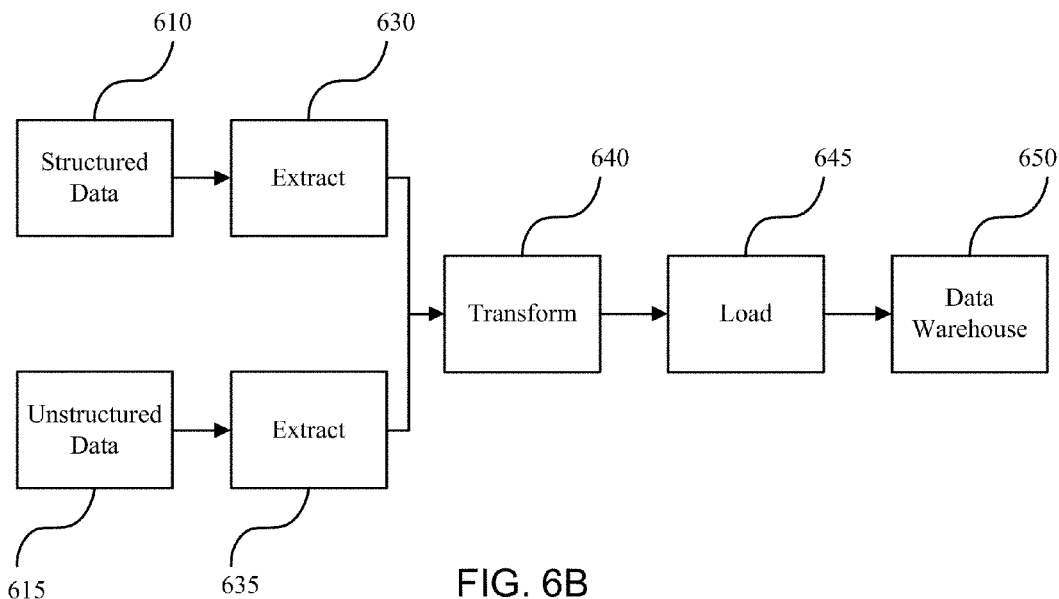

Using a uniform approach for ETL flows of structured and unstructured data can enable use a same data warehouse infrastructure. Additionally, by incorporating unstructured data into the same framework, quality-objective-driven optimization can be enabled. The metrics described above for use with structured data may be applied to unstructured data. As shown in FIG. 6A, separate pipes may be designed for the structured and unstructured data flows, and such a design may be simpler to design than an integrated pipeline such as is shown in FIG. 6B. A single pipe with two separate extraction stages and a single integrated transformation-load stage, as shown in FIG. 6B can provide opportunities for end-to-end optimization by bringing unstructured data into a same quality-metric-driven design and optimization environment that has been described above for structured data.

Figure 7:
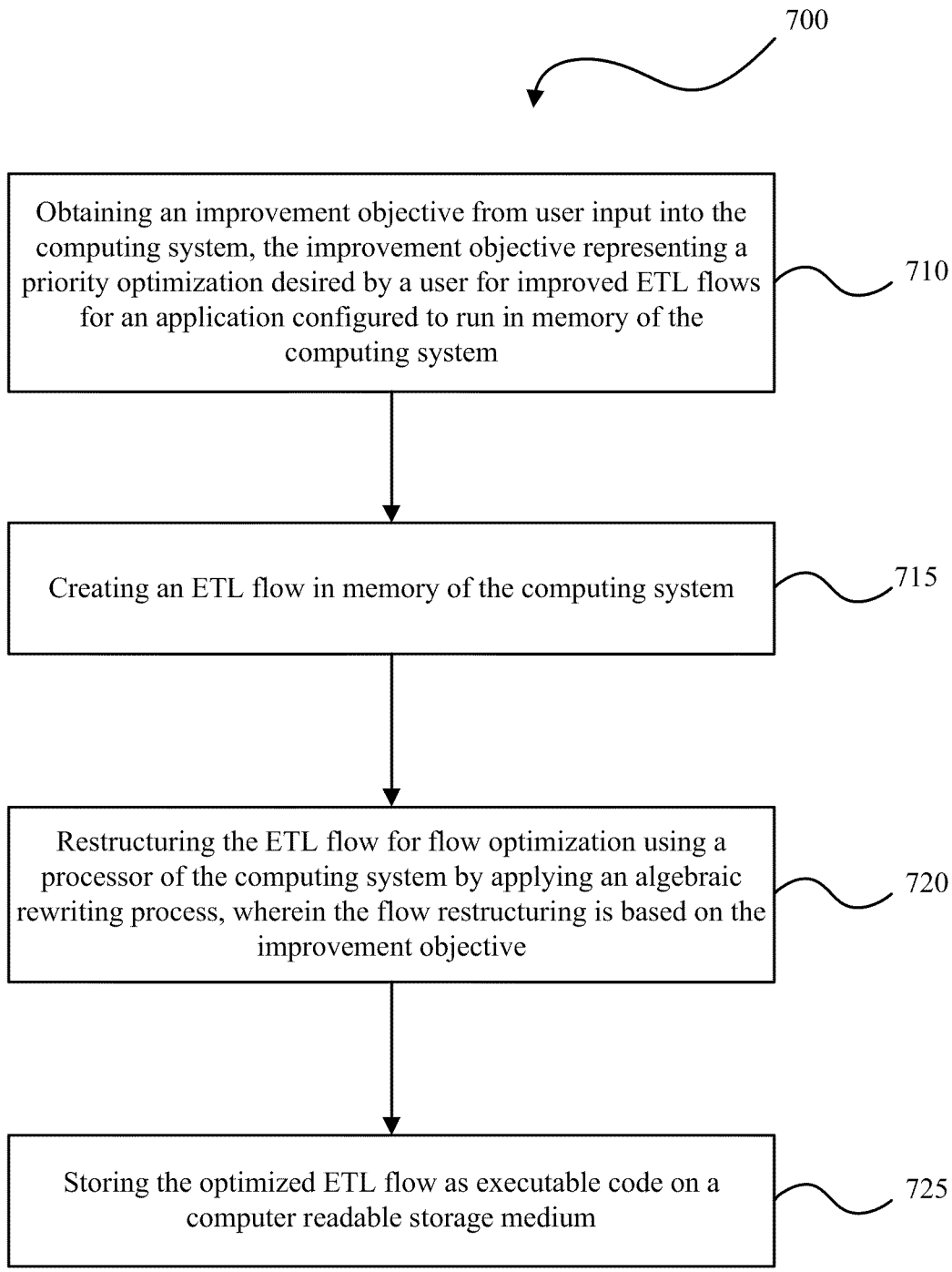
FIG. 7 is a flow chart of a method for ETL process optimization on a computing system applying an algebraic flow rewriting optimization in accordance with an embodiment

Referring to FIG. 7, a method 700 is shown for Extract Transform Load (ETL) process optimization on a computing system in accordance with an embodiment. An improvement objective is obtained 710 from user input into the computing system, the improvement objective representing a priority optimization desired by a user for improved ETL flows for an application configured to run in memory of the computing system. The improvement objective can be a quality objective or metric as described previously. An ETL flow is created 715 in memory of the computing system. The ETL flow is restructured 720 for flow optimization using a processor of the computing system by applying an algebraic rewriting process, wherein the flow restructuring is based on the improvement objective. In one aspect, the algebraic rewriting process may require creating a graph of algebraic operators with data flow between the operators, the algebraic properties of the operators and the graph being usable by the processor in determining optimal algebraic rewriting. The optimized ETL flow can be stored 725 as executable code on a computer readable storage medium. In one aspect, restructuring the ETL flow further comprises applying a flow rewriting optimization. The method may further include determining computing resources available for processing ETL flows, and wherein the flow restructuring is based on the improvement objective and the available computing resources. As described above, various improvement objectives may include one or more of system reliability, system maintainability, data freshness, flow recoverability, system scalability, system availability, system flexibility, system robustness, system affordability, system and data consistency, data traceability, and data auditability, among others. In one aspect, the quality or improvement objectives can be translated into metric quality objectives using the processor, and representing the ETL flow as a graph wherein the metric quality objectives are represented as graph properties on the graph.

The method can further include optimizing data flows including structured and unstructured data, and incorporating the structured and unstructured data into a common data warehouse or into a common database on the computer readable storage medium. Optimizing data flows and incorporating data for structured and unstructured data can be accomplished by using an integrated structured and unstructured pipeline to load data into the data warehouse.

Figure 8:
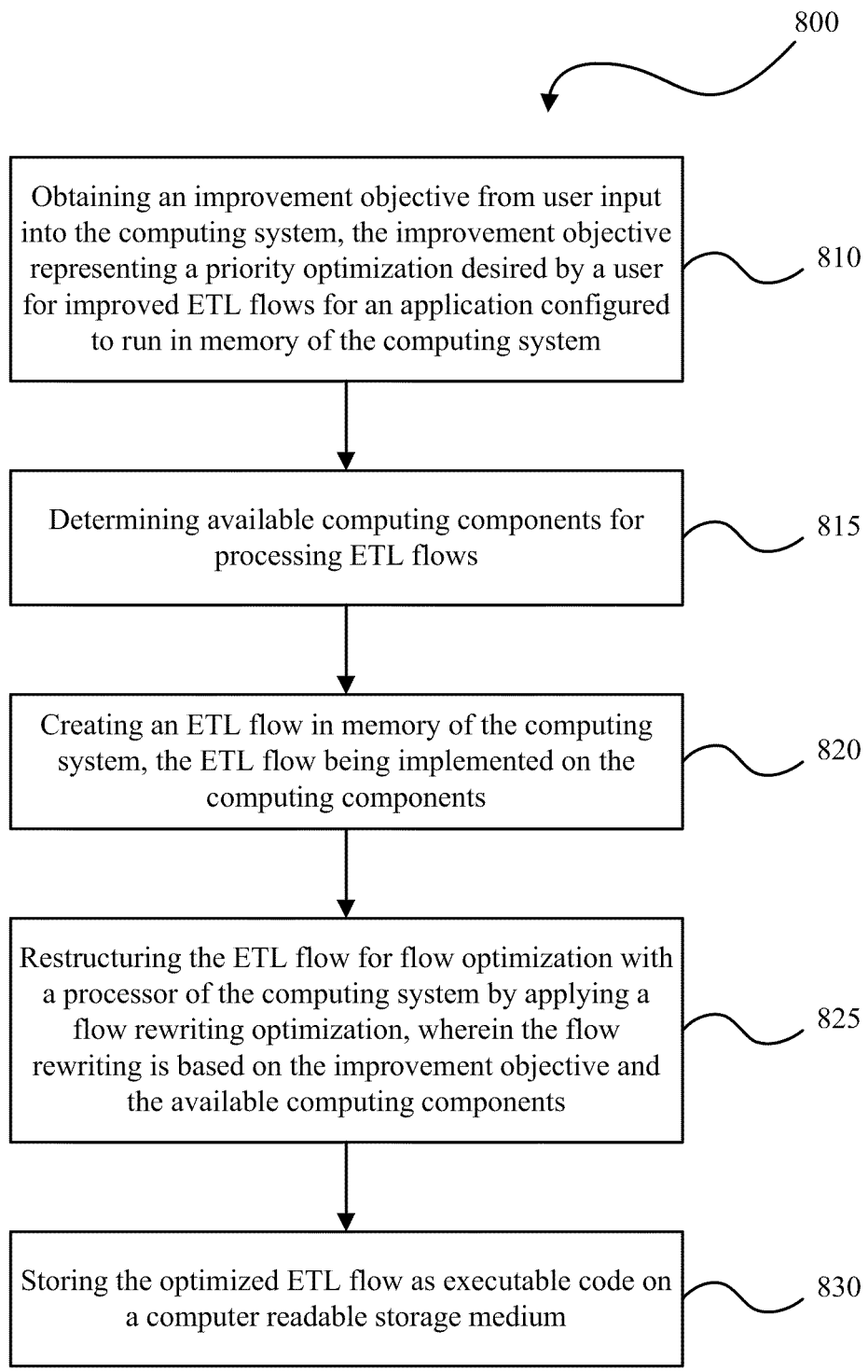
FIG. 8 is a flow chart of a method for ETL process optimization on a computing system applying a flow restructuring optimization in accordance with an embodiment.

Referring to FIG. 8, a method 800 is shown for Extract Transform Load (ETL) process optimization on a computing system in accordance with an embodiment. An improvement objective is obtained 810 from user input into the computing system, the improvement objective representing a priority optimization desired by a user for improved ETL flows for an application configured to run in memory of the computing system. Network nodes and available computing components are determined 815 for processing ETL flows. Such a determination may be made by the system or by a user. Whether by the system or by the user may depend upon preference and/or requirements for a particular project. An ETL flow is created 820 in memory of the computing system, the ETL flow being configured to flow between the network nodes. The ETL flow is restructured 825 for flow optimization with a processor of the computing system by applying a flow rewriting optimization, wherein the flow restructuring is based on the improvement objective and the available computing components. The flow rewriting technique can include at least one of collapsing long sequential flow chains, eliminating conditional branching nodes, factorizing common operations, parallelizing flows and adding recovery points. The ETL flow can also be restructured by applying an algebraic flow rewriting technique. The optimized ETL flow is stored 830 as executable code on a computer readable storage medium.

As described above, the improvement objective may include one or more of system reliability, system maintainability, data freshness, flow recoverability, system scalability, system availability, system flexibility, system robustness, system affordability, system and data consistency, data traceability, data auditability, and so forth. As noted herein, the ETL flow may comprise an Extract Transform Load (ETL) flow, an Extract Load Transform (ELT) flow, and/or an Extract Transform Load Transform (ETLT) flow.

Figure 9:
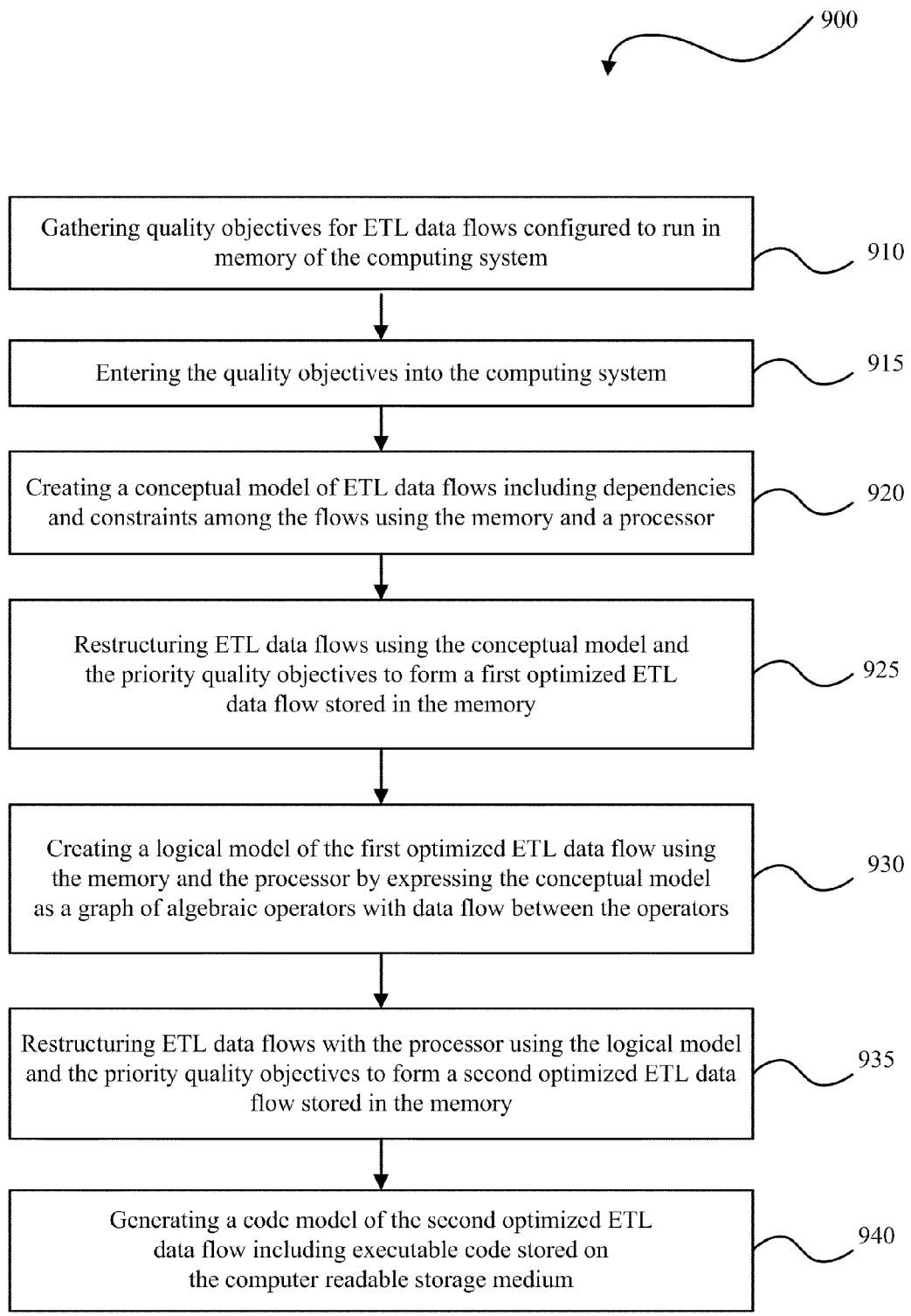
FIG. 9 is a flow chart of a method for integration of quality objectives into an ETL flow on a computing system in accordance with an embodiment.

Referring to FIG. 9, a method 900 is shown for integration of quality objectives into an Extract Transform Load (ETL) flow on a computing system in accordance with an embodiment. Quality objectives are gathered 910 for ETL data flows configured to run in memory of the computing system. In one aspect, a priority quality objective is determined from the gathered objectives and entered into the computing system. In another aspect, the gathered quality objectives can be entered 915 into the computing system. A conceptual model of ETL data flows is created 920 including dependencies and constraints among the flows using the memory and a processor. ETL data flows are restructured 925 using the conceptual model and the quality objectives to form a first optimized ETL data flow stored in the memory. A logical model of the first optimized ETL data flow is created 930 using the memory and the processor by expressing the conceptual model as a graph of algebraic operators with data flow between the operators. ETL data flows are restructured 935 with the processor using the logical model and the quality objectives to form a second optimized ETL data flow stored in the memory. A code model of the second optimized ETL data flow is generated 940, the code model including executable code stored on the computer readable storage medium. Generation of a code model can provide a further optimization wherein resource allocation, scheduling, alternative implementation of operators, and other features or options are used for the optimization. (Similarly such features or options may be considered in the generation of conceptual and logical models).

The method can further include executing the code model stored on the computer readable storage medium using the processor. Gathering quality objectives, determining the priority objective, and entering the priority objective can be performed by the computing system using information stored in memory or on a computer readable storage medium. In one aspect, creation of the conceptual model may further comprise creating a quality objective interdependency graph. Restructuring ETL data flows may then further comprise using the quality objective interdependency graph in forming the first optimized ETL data flow. Also, optimizing ETL processes as in the method may further comprise generating an ETL flow for an entire set of ETL transformations based on the conceptual and logical models using the computing system.

Various aspects of embodiments of the ETL process optimizations described herein may be performed on a computing system or in a network of data processing systems. The computing system may or network may include one or more workstations, modems, servers, or the like. A network bus may communicate data between network nodes and may be comprised of wires or fiber optic cable or may be a wireless network. The network may operate pursuant to any number of networking standards. The network can be a local area network (LAN) and may comprise a plurality of computer systems (which may be referred to as workstations) where some computer systems may be server computer systems and other computer systems may be client computer systems. Computer systems may communicate via a gateway or a server. The network may include an Internet server as well. The server or computing system may include various computing components, such as a processor and memory which may be interconnected by a system bus. A display controller and/or a display device may be coupled to the processor through the system bus. A computer readable storage medium which stores information or data may be a part of the computing system. The computer readable storage medium may be a form of magnetic, optical or other form of media. The computer readable storage medium may be coupled to processor and the memory through the system bus. The computing system may include input and output devices. Various user input devices may be used for receiving user input. A non-exhaustive list of well known input devices includes keyboards, mice, trackballs, touchpads, and styluses (pens). Input devices may communicate with the processor and memory via a controller such as an I/O (Input/Output) controller. Other computing components and variations on the aforementioned computing components may also be used in accordance with the embodiments described herein.

The ETL flow optimization processes and techniques described herein can provide numerous benefits for efficient and effective ETL flows for enterprises, and simplify ETL flow design processors for ETL flow designers. Furthermore, the ETL flow optimization processes and techniques described herein can enable automated tools (processors) for ETL design which have been previously unavailable. As described herein, design of the integration pipeline can be automated. Currently, there are no tools for automatically generating optimized designs as described herein. An optimized design can be produced which satisfies various quality requirements/objectives. Previous approaches have failed to address optimal design with respect to different quality objectives as described herein. Manual flow design, as is a current practice can require weeks or months of flow design effort as opposed to the minutes or hours in which an optimized flow design may be created as described herein. Hence, ETL flow design time can be reduced by up to several orders of magnitude. The cost of a design process can be reduced through design automation which can free human resources. An ETL flow designer can be relieved of the burden and complexity of creating an optimal ETL flow design using the ETL flow optimization processes and techniques described herein. Numerous other advantages and benefits will be apparent to one having skill in the art.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for Extract Transform Load (ETL) process optimization on a computing system, comprising:
    receiving an improvement objective from user input into the computing system, the improvement objective representing a priority optimization requested by a user for improved ETL flows for an application configured to run in the computing system;
    restructuring, by at least one processor in the computing system based on the improvement objective, the ETL flows at respective different design levels using respective different models for creating at least one optimized ETL flow, wherein an output of the restructuring at one of the design levels is provided as an input to affect the restructuring at another of the design levels; and
    storing the at least one optimized ETL flow as executable code on a computer readable storage medium.

2. A method in accordance with claim 1, wherein restructuring the ETL flows at one of the design levels based on the improvement objective comprises applying a flow rewriting optimization.

3. A method in accordance with claim 2, further comprising determining computing resources available for processing ETL flows, and wherein the flow rewriting optimization is based on the improvement objective and the available computing resources.

4. A method in accordance with claim 1, wherein the improvement objective comprises at least one of system reliability, system maintainability, data freshness, flow recoverability, system scalability, system availability, system flexibility, system robustness, system affordability, system and data consistency, data traceability, and data auditability.

5. A method in accordance with claim 1, wherein restructuring the ETL flows at one of the design levels based on the improvement objective comprises applying an algebraic rewriting process.

6. A method in accordance with claim 5, wherein applying the algebraic rewriting process comprises creating a graph of algebraic operators with data flow between the algebraic operators, the graph being used by the at least one processor in restructuring the ETL flows at the one design level.

7. A method in accordance with claim 1, wherein a first of the models is a conceptual model of the ETL flows including dependencies and constraints among the ETL flows, and a second of the models is a logical model of a first optimized ETL flow produced by the restructuring at a first of the design levels, the logical model created by expressing the conceptual model as a graph of algebraic operators with data flow between the algebraic operators.

8. A method in accordance with claim 1, further comprising optimizing data flows including structured and unstructured data, and incorporating the structured and unstructured data into a common data warehouse or into a common database on the computer readable storage medium.

9. A method in accordance with claim 8, wherein optimizing the data flows and incorporating the structured and unstructured data comprises using an integrated structured and unstructured pipeline to load data into the data warehouse.

10. A method in accordance with claim 1, further comprising translating the improvement objective into quality metrics using the at least one processor, and representing the ETL flows as a graph wherein the quality metrics are represented as graph properties on the graph.

11. A method for integration of quality objectives into an Extract Transform Load (ETL) flow on a computing system comprising:
gathering quality objectives for ETL data flows configured to run in memory of the computing system;
entering the quality objectives into the computing system;
creating a conceptual model of the ETL data flows including dependencies and constraints among the ETL data flows using a processor;
restructuring the ETL data flows using the conceptual model and the quality objectives to form a first optimized ETL data flow stored in the memory;
creating a logical model of the first optimized ETL data flow using the processor by expressing the conceptual model as a graph of algebraic operators with data flow between the algebraic operators;
restructuring the ETL data flows with the processor using the logical model and the quality objectives to form a second optimized ETL data flow stored in the memory; and
generating a code model of the second optimized ETL data flow including executable code stored on a computer readable storage medium.

12. A method in accordance with claim 11, wherein the quality objectives comprise at least one of system reliability, system maintainability, data freshness, flow recoverability, system scalability, system availability, system flexibility, system robustness, system affordability, system and data consistency, data traceability, and data auditability.

13. A method in accordance with claim 11, further comprising executing the code model stored on the computer readable storage medium using the processor.

14. A method in accordance with claim 11, wherein gathering the quality objectives and entering the quality objectives is performed by the computing system using information stored in the memory or on the computer readable storage medium.

15. A method in accordance with claim 11, wherein creating the conceptual model further comprises creating a quality objective interdependency graph and wherein restructuring the ETL data flows further comprises using the quality objective interdependency graph in guiding the selection of flow restructuring optimizations.

16. A non-transitory computer-readable storage medium storing instructions for Extract Transform Load (ETL) process optimization, the instructions upon execution causing a computing system to:
receive a user-input quality objective that represents a priority optimization for improved ETL flows for an application configured to run in the computing system;
restructure, based on the quality objective, the ETL flows at respective different design levels using respective different models for creating at least one optimized ETL flow, wherein an output of the restructuring at one of the design levels is provided as an input to affect the restructuring at another of the design levels; and
store the at least one optimized ETL flow as executable code on the computer readable storage medium.

17. A non-transitory computer-readable storage medium in accordance with claim 16, wherein a first of the models is a conceptual model of the ETL flows including dependencies and constraints among the ETL flows, and a second of the models is a logical model of a first optimized ETL flow produced by the restructuring at a first of the design levels, the logical model created by expressing the conceptual model as a graph of algebraic operators with data flow between the algebraic operators.

18. A non-transitory computer-readable storage medium in accordance with claim 16, wherein restructuring the ETL flows at one of the design levels based on the quality objective comprises applying an algebraic rewriting process.

19. A non-transitory computer-readable storage medium in accordance with claim 18, wherein applying the algebraic rewriting process comprises creating a graph of algebraic operators with data flow between the algebraic operators, the graph being used in restructuring the ETL flows at the one design level.

20. A non-transitory computer-readable storage medium in accordance with claim 16, wherein restructuring the ETL flows at one of the design levels based on the quality objective comprises applying a flow rewriting optimization.

21. A non-transitory computer-readable storage medium in accordance with claim 20, wherein the instructions are executable to cause the computing system to further determine computing resources available for processing ETL flows, and wherein the flow rewriting optimization is based on the quality objective and the available computing resources.

22. A non-transitory computer-readable storage medium in accordance with claim 20, wherein applying the flow rewriting optimization comprises at least one of collapsing long sequential flow chains, eliminating conditional branching nodes, factorizing common operations, and parallelizing flows and adding recovery points.

* * * * *